(12) United States Patent
Nagesh et al.

(10) Patent No.: US 12,531,422 B2
(45) Date of Patent: Jan. 20, 2026

(54) FLEXIBLE LOAD STABILIZATION MODES FOR A POWER DISTRIBUTION SYSTEM

(71) Applicant: Caterpillar Inc., Peoria, IL (US)

(72) Inventors: Sowmya Nagesh, Peoria, IL (US); Gregory Scott Hasler, Pekin, IL (US); Ronald Christopher Gayles, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/736,086

(22) Filed: Jun. 6, 2024

(65) Prior Publication Data

US 2025/0379449 A1    Dec. 11, 2025

(51) Int. Cl.
*H02J 3/38*      (2006.01)
*H02J 3/00*      (2006.01)
*H02J 3/46*      (2006.01)

(52) U.S. Cl.
CPC .............. *H02J 3/388* (2020.01); *H02J 3/007* (2020.01); *H02J 3/46* (2013.01)

(58) Field of Classification Search
CPC ................ H02J 3/388; H02J 3/007; H02J 3/46
See application file for complete search history.

(56) References Cited

U.S. PATENT DOCUMENTS

| | | |
|---|---|---|
| 11,501,389 B2 | 11/2022 | Forbes, Jr. et al. |
| 11,581,741 B2 | 2/2023 | Campus et al. |
| 11,749,990 B2 | 9/2023 | Sanders et al. |
| 2016/0313716 A1* | 10/2016 | Chen ......................... H02J 4/00 |
| 2019/0148941 A1 | 5/2019 | Wang et al. |
| 2019/0267838 A1 | 8/2019 | Majumder |
| 2019/0341781 A1 | 11/2019 | Marchegiani et al. |
| 2021/0359521 A1 | 11/2021 | Gayles et al. |
| 2022/0131381 A1 | 4/2022 | Sergott et al. |
| 2022/0131388 A1 | 4/2022 | Sergott et al. |

(Continued)

FOREIGN PATENT DOCUMENTS

| | | |
|---|---|---|
| EP | 4354686 A1 | 4/2024 |
| IN | 202241039576 A | 7/2022 |
| WO | 2020023998 A1 | 2/2020 |

OTHER PUBLICATIONS

Written Opinion and International Search Report for Int'l. Patent Appln. No. PCT/US2025/030485, mailed Oct. 7, 2025 (13 pgs).

*Primary Examiner* — Carlos Amaya
(74) *Attorney, Agent, or Firm* — Harrity & Harrity LLP (57) ABSTRACT

A power distribution system includes a macrogrid controller configured to control one or more first loads associated with a macrogrid, wherein the one or more first loads include a microgrid comprising one or more second loads and a plurality of energy resource systems; and a microgrid controller configured to receive one or more control signals from the macrogrid controller and control a power connection of the microgrid to the macrogrid based on the one or more control signals. The microgrid controller is configurable in a grid-connected mode, during which the microgrid is connected to the macrogrid, and a stand-alone mode, during which the microgrid is disconnected from the macrogrid, and wherein the microgrid controller is configured to operate in the grid-connected mode or in the stand-alone mode based on the one or more control signals.

20 Claims, 4 Drawing Sheets

(56) References Cited

U.S. PATENT DOCUMENTS

| | | |
|---|---|---|
| 2022/0302712 A1* | 9/2022 | Srinivasan ............. H02J 3/381 |
| 2023/0316068 A1 | 10/2023 | Roy et al. |
| 2023/0396067 A1 | 12/2023 | Manikfan et al. |

* cited by examiner

FLEXIBLE LOAD STABILIZATION MODES FOR A POWER DISTRIBUTION SYSTEM

TECHNICAL FIELD

The present disclosure relates generally to microgrids and, for example, to a microgrid controller configured to control or manage an operation of a microgrid.

BACKGROUND

A microgrid is a self-sufficient energy system that serves a particular geographic area, such as a college campus, a hospital complex, a business center, a neighborhood, a mining site, a drilling site, and/or the like. Within a microgrid are one or more kinds of distributed energy resources (DERs) (e.g., solar panels, wind turbines, fuel cells, photovoltaic (PV) cells, generators, energy storage devices (e.g., batteries, capacitors, etc.), and/or other energy sources) that produce power for the microgrid. Some microgrids are configured as off-grid electrical power distribution systems (e.g., stand-alone microgrids or islands) that do not connect to a larger electrical power distribution system (e.g., a macrogrid) run by, for example, an electric utility or power plant. Some microgrids are able to operate in a grid-connected mode and in a stand-alone mode. In a grid-connected mode, a microgrid may operate connected to and synchronous with the larger electrical power distribution system. In a stand-alone mode, the microgrid may be disconnected from the larger electrical power distribution system and operate as a stand-alone microgrid. A microgrid controller may control whether the microgrid operates in the grid-connected mode or in the stand-alone mode, for example, based on a schedule or based on one or more conditions being satisfied.

A microgrid controller may need to interact with an external controller of the larger electrical power distribution system to not only meet power limits of the larger electrical power distribution system but to efficiently manage power distribution schemes within the microgrid based on how much power the microgrid is permitted to draw from the larger electrical power distribution system.

U.S. Patent Application US2023396067A1 discloses a battery energy storage system that receives energy from an electrical grid and supplies electrical energy to one or more microgrids. In US2023396067A1, the battery energy storage system comprises a power conversion system arranged to charge a battery with the energy from the electrical grid and discharge the battery to supply electrical energy to the one or more microgrids. Furthermore, in US2023396067A1, an energy control system controller communicatively coupled to the power conversion system manages the energy drawn from the electrical grid to charge the battery and to manage the energy discharged from the battery to supply electrical energy to the one or more microgrids.

The microgrid controller of the present disclosure solves one or more of the problems set forth above and/or other problems in the art. For example, the microgrid controller is configured to handle requests from an external controller, and adapt a configuration within the microgrid in order to satisfy the requests, including stabilizing loads within the microgrid for combinations of all types of DERs.

SUMMARY

In some implementations, a power distribution system includes a macrogrid controller configured to control one or more first loads associated with a macrogrid, wherein the one or more first loads include a microgrid comprising one or more second loads and a plurality of energy resource systems; and a microgrid controller configured to receive one or more control signals from the macrogrid controller and control a power connection of the microgrid to the macrogrid based on the one or more control signals, wherein the microgrid controller is configurable in a grid-connected mode, during which the microgrid is connected to the macrogrid, and a stand-alone mode, during which the microgrid is disconnected from the macrogrid, and wherein the microgrid controller is configured to operate in the grid-connected mode or in the stand-alone mode based on the one or more control signals.

In some implementations, a microgrid controller of a microgrid includes one or more communication interfaces configured to receive one or more first control signals from a macrogrid controller of a macrogrid, provide one or more second control signals for controlling a power connection of the microgrid to a macrogrid, provide one or more third control signals for controlling a plurality of loads associated with the microgrid, and provide one or more fourth control signals for controlling a plurality of energy resource systems associated with the microgrid; and one or more processors configured to process the one or more first control signals and control a power connection of the microgrid to the macrogrid based on the one or more first control signals, wherein the microgrid controller is configurable in a grid-connected mode, during which the microgrid is connected to the macrogrid, and a stand-alone mode, during which the microgrid is disconnected from the macrogrid, wherein the microgrid controller is configured to operate in the grid-connected mode or in the stand-alone mode based on the one or more first control signals, and wherein the one or more processors are configured to generate the one or more second control signals, the one or more third control signals, and the one or more fourth control signals based on the microgrid controller operating in the grid-connected mode or in the stand-alone mode.

In some implementations, a control method includes receiving, by a microgrid controller of a microgrid, one or more first control signals from a macrogrid controller of a macrogrid; operating, by the microgrid controller, in a grid-connected mode, during which the microgrid is connected to the macrogrid, or in a stand-alone mode, during which the microgrid is disconnected from the macrogrid based on the one or more first control signals; based on operating in the grid-connected mode or the stand-alone mode, generating, by the microgrid controller, one or more second control signals for controlling a power connection of the microgrid to a macrogrid; based on operating in the grid-connected mode or the stand-alone mode, generating, by the microgrid controller, one or more third control signals for controlling a plurality of loads associated with the microgrid; and based on operating in the grid-connected mode or the stand-alone mode, generating, by the microgrid controller, one or more fourth control signals for controlling a plurality of energy resource systems associated with the microgrid.

DETAILED DESCRIPTION

This disclosure relates to a power distribution system, and is applicable to any system that distributes and/or receives power via a power grid. Some aspects relate to a microgrid controller that is configured to control one or more components and/or systems associated with the microgrid, including energy resource systems and/or microgrid loads. The microgrid controller may control a state of the microgrid based on one or more conditions being satisfied. Some aspects relate to a macrogrid controller that is configured to control one or more macrogrid loads and/or systems associated with a macrogrid, which may include treating the microgrid as one of the macrogrid loads.

This microgrid controller may be configured to manage hundreds of DERs and to manage any combination DERs on multiple electrical buses. However, the microgrid controller may be superseded by an external controller such that the microgrid controller must meet the requirements specified by the external controller while performing control over the microgrid. The external controller may be a macrogrid controller, which may be a controller of a macrogrid. For example, the macrogrid controller may be a controller of an electric utility, a power plant, and/or a virtual power plant (VPP). The external controller may request the microgrid controller to connect to or island off from the macrogrid, request a desired value of real power flow or a value of reactive power flow at a point of common coupling (PCC) (e.g., a microgrid power limit that defines a total amount of power that the microgrid is permitted to draw from the macrogrid), and enable and disable grid support functions (e.g., whether the microgrid supplies power to the macrogrid). In response, the microgrid controller may manage loads and DERs associated with the microgrid to meet the requests received from the external controller. The microgrid may be deemed to be a load or a DER the macrogrid. Thus, the microgrid controller may configure the microgrid to be a load or a DER of the macrogrid based on one or more requests received from the external controller.

Figure 1:
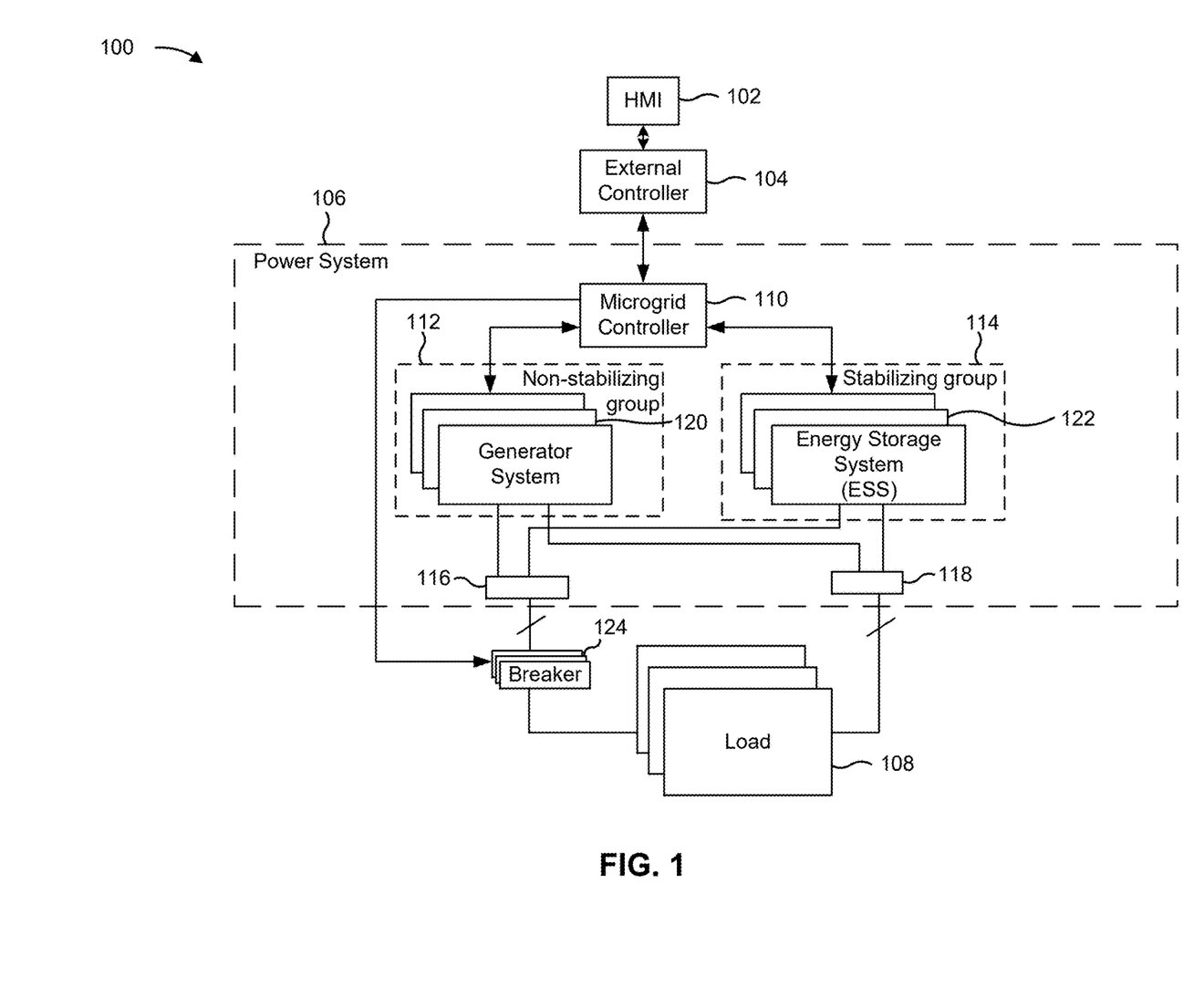
FIG. 1 shows a system according to one or more implementations.

FIG. 1 shows a system 100 according to one or more implementations. The system 100 may include a human-to-machine interface (HMI) 102, an external controller 104, a power system 106, and one or more loads 108.

The power system 106 may be a microgrid or other type of electrical power distribution system that may provide power to the one or more loads 108. In some cases, the power system 106 may be an off-grid electrical power distribution system. In some cases, the power system 106 may be configurable to operate in a grid-connected mode and in a stand-alone mode. The power system 106 may include a microgrid controller 110, a non-stabilizing group of energy resource systems 112 (e.g., a non-stabilizing group of DERs), a stabilizing group of energy resource systems 114 (e.g., a stabilizing group of DERs), and interfaces 116 and 118. Generally, "off-grid" may mean that the electrical power distribution system is not connected to a larger electrical power distribution system run by, for example, an electric utility or other large-scale electric power generation plant that serves electricity to a geographic area, campus, compound, etc. However, techniques disclosed herein may still be applied to electrical power distribution systems that are connected to larger electrical power distribution systems. For instance, the larger electrical power distribution systems may operate as a power source in a primary provider role or secondary provider role, while the power system 106 may operate as a power source in the other of the primary provider role or secondary provider role.

The non-stabilizing group of energy resource systems 112 may include one or more energy generator systems 120. Each energy generator system 120 may include a power generator (e.g., an engine-generator, a fuel cell, a PV cell, or other power generating system) and a local generator controller communicatively coupled to the microgrid controller 110. Thus, each energy generator system 120 may generate power from a respective power source. Each local generator controller may control how much power a respective power generator generates, control a rate of power distribution, and/or obtain status information corresponding to the respective power generator. Each local generator controller may be controlled by the microgrid controller 110.

The stabilizing group of energy resource systems 114 may include one or more energy storage systems (ESSs) 122. Each energy storage system 122 may include an electric storage device (e.g., one or more batteries and/or capacitors) and a local ESS controller communicatively coupled to the microgrid controller 110. Each local ESS controller may control a flow of power into or out of a respective electric storage device, including charging of the respective electric storage device and discharging of the respective electric storage device, control a rate of power flow, and/or obtain status information corresponding to the respective electric storage device, such as state-of-charge (SOC), state-of-health (SOH), discharge limit, and other device parameters. Each local ESS controller may be controlled by the microgrid controller 110.

The system 100 may also include one or more breakers 124 (e.g., distribution breakers or switches) that may be individually controlled by the microgrid controller 110 to connect a respective load 108 to the power system 106 or disconnect the respective load 108 from the power system 106. The one or more breakers 124 may be part of one or both interfaces 116 and 118.

The HMI 102 may include one or more processors, and may be configured to receive and process one or more inputs from a user, such as an operator. Additionally, the HMI 102 may be configured to provide one or more prompts or outputs to the user. Thus, the HMI 102 may be a user terminal configured to interact with a user to process information and/or commands provided by the user, provide information to the user (e.g., status information), and/or perform one or more tasks or functions in response to processing the information and/or commands provided by the user. The HMI 102 may be communicatively coupled to the external controller 104, which may be communicatively coupled to the microgrid controller 110. In some implementations, the HMI 102 may be communicatively coupled directly to the microgrid controller 110. The external controller 104 may send commands to and receive information from the microgrid controller 110. For example, the external controller 104 may send commands to the microgrid controller 110 based on information received from the HMI 102. Thus, the external controller 104 may be a user-commanded controller. The external controller 104 may be integrated with the HMI 102. The external controller 104 may be a controller of a larger electrical power distribution system (e.g., a macrogrid, a power generation plant, and/or electric utility provider).

The power system 106 may provide electrical power to the one or more loads 108. Generally, the power system 106 may provide alternating current (AC) power at a particular voltage and a particular current. The microgrid controller 110 may control one or more energy storage systems 122 to instantaneously inject power when power is needed by the power system 106 or instantaneously absorb surplus power generated by the power system 106. Accordingly, one of more electric storage devices of the energy storage systems 122 may act as a power consumer on one or more energy generator systems 120 or as a power source for the one or more energy generator systems 120, to thereby ensure that system bus frequencies of the non-stabilizing group of energy resource systems 112 are maintained at a nominal value. In other words, the microgrid controller 110 may control the stabilizing group of energy resource systems 114 to stabilize loads of the non-stabilizing group of energy resource systems 112 in order to maintain the non-stabilizing group of energy resource systems 112 at a relatively constant load, which may reduce a recurrence of frequency deviations from the nominal value.

The microgrid controller 110 may be integrated with, or separate from (but connected to), the interfaces 116 and 118, the energy generator systems 120, and the energy storage systems 122, or combinations thereof. In this manner, a user may, through interaction with the HMI 102, add or remove energy generator systems 120 to increase/reduce system power generation and/or add or remove energy storage systems 122 to increase/reduce system energy storage capacity, in accordance with a user's preference. For instance, a user may prefer to add additional energy generator systems 120 and/or add additional energy storage systems 122 to increase load capacity if additional loads 108 are expected to be connected to the power system 106, or remove energy generator systems 120 and/or remove energy storage systems 122 to decrease load capacity if loads 108 are expected to be disconnected from the power system 106. Additionally, the microgrid controller 110 may be configured to add or remove energy generator systems 120 and/or add or remove energy storage systems 122 from the power system 106 based on one or more conditions being satisfied. In some cases, the microgrid controller 110 may be configured to add or remove energy generator systems 120 and/or add or remove energy storage systems 122 from the power system 106 based on a schedule.

The one or more loads 108 may be any device that can connect to a power distribution system, such as the power system 106, to receive electrical power. Examples of loads may include heavy machinery (e.g., electric mining machines, haulers, etc.), personal devices, appliances, heating, ventilation, and air conditioning (HVAC) systems, industrial drills, personal residence electrical distribution systems, etc. The loads 108 may include one or more non-stable loads, such as one or more cyclic loads. The loads 108 may include unidirectional loads (e.g., loads that can only receive power from the power system 106), bi-directional loads (e.g., loads that can both receive power from the power system 106 and provide power to the power system 106), charging loads (e.g., loads that include a chargeable electric battery), essential loads (e.g., loads that require uninterrupted service), and/or non-essential loads (e.g., loads that do not require uninterrupted service). Loads may be assigned different priorities based on load type, load classification, and/or operation state or mode.

Generally, the one or more loads 108 may receive the power from the power system 106 and use the power in accordance with the operations of the one or more loads 108. Users of the power system 106 and the one or more loads 108 may connect/disconnect the one or more loads 108 by electrically connecting the one or more loads 108 to the interfaces 116 and 118 of the power system 106. For instance, the interfaces 116 and 118 may have AC plugs/sockets to connect the one or more loads 108 in parallel to the one or more energy generator systems 120 and the one or more energy storage systems 122 of the power system 106. One or more loads 108 may include a local load controller that may collect load information and transmit the load information to the microgrid controller 110. Load information may include information indicating a load type, a load classification, and/or an operation state or mode of a load 108. Load information may include load data of a load, such as maximum load and minimum load. For chargeable loads, load information may include maximum charging load, maximum state of charge, minimum state of charge, current state of charge, and usable discharge energy as a function of the current state of charge. Load information may be received by the microgrid controller 110 via the interfaces 116 and 118, which may include one or more communication interfaces coupled to the microgrid controller 110.

The interfaces 116 and 118 may also have a plurality of generator connections and a plurality of energy store connections. The plurality of generator connections may be hardwired electrical connections and/or AC plugs/sockets to connect the one or more energy generator systems 120 in parallel to the at least one load 108 and the one or more energy storage systems 122. The plurality of energy store connections may be hardwired electrical connections and/or AC plugs/sockets to connect the one or more energy storage systems 122 in parallel to the one or more loads 108 and the one or more energy generator systems 120. For instance, the power system 106 may or may not allow addition/removal of energy generator systems 120 and/or addition/removal of energy storage systems 122. Therefore, depending on a configuration, the interfaces 116 and 118 may include: (1) hardwired electrical connections that connect the at least one energy generator system 120; (2) AC plugs/sockets to connect/disconnect the at least one energy generator system 120; (3) hardwired electrical connections that connect the at least one energy storage system 122; and/or (4) AC plugs/sockets to connect/disconnect the at least one energy storage system 122. The interfaces 116 and 118 may be coupled to a system bus (e.g., a power bus) of the power system 106. The system bus may enable one of more of the energy storage systems 122 to absorb power from one or more energy generator systems 120 and/or one or more loads 108 (e.g., for charging and/or storing power).

The one or more energy generator systems 120 may also include communication interfaces. The communication interfaces of the one or more energy generator systems 120 may enable the one or more energy generator systems 120 to communicate with the microgrid controller 110. For instance, the one or more energy generator systems 120 may be connected to the microgrid controller 110 by wired or wireless communication. The one or more energy generator systems 120 may provide the microgrid controller 110 with generator data. The generator data, for each of the one or more energy generator systems 120, may include load data and/or generator parameters. The load data may include a current (e.g., instantaneous) load seen by the one or more energy generator systems 120 and/or past load data (if one or more energy generator systems 120 store such data locally). The current load/past load data may include voltage (e.g., in volts) and/or current (e.g., in amperes) measured by one or more sensor components included in an energy generator system 120. The generator parameters may include a generator set maximum threshold value and a generator set minimum threshold value. Alternatively, to reduce transmission bandwidth, the generator data may omit the generator parameters, and the one or more energy generator systems 120 may transmit the generator parameters during an initial configuration process between the one or more energy generator systems 120 and the microgrid controller 110. The generator set maximum threshold value and the generator set minimum threshold value may indicate a maximum power load and a minimum power load, respectively, that a generator of an energy generator system 120 may support.

The one or more energy storage systems 122 may be any energy storage device that can store and output AC power. For instance, the one or more energy storage systems 122 may include at least one electrical-chemical energy storage (e.g., a battery), electrical energy storage (e.g., a capacitor, a supercapacitor, or a superconducting magnetic energy storage), mechanical energy storage (e.g., a fly wheel, a pump system), and/or any combination thereof. The one or more energy storage systems 122 may include inverters (individually or collectively) so that the one or more energy storage systems 122 may operate as a power consumer or a power source. The one or more energy storage systems 122 may also include electronic control mechanisms to control (1) how much load the one or more energy storage systems 122 draw, or (2) how much AC power the one or more energy storage systems 122 output.

The one or more energy storage systems 122 may also include communication interfaces. The communication interfaces of the one or more energy generator systems 120 may enable the one or more energy storage systems 122 to communicate with the microgrid controller 110. For instance, the one or more energy storage systems 122 may be connected to the microgrid controller 110 by wired or wireless communication. The one or more energy storage systems 122 may provide the microgrid controller 110 with energy storage data and may receive instructions from the microgrid controller 110.

The energy storage data may include, for each of the at least one energy store, a current energy level (e.g., kilowatt-hours currently stored), total energy storage capacity (e.g., kilowatt-hours of capacity), and/or discharge/charge parameters. The current energy level may be measured by a battery meter of an energy storage. The battery meter may one or combinations of a voltmeter, an amp-hour meter, and/or an impedance-based meter. The discharge/charge parameters may indicate an amount of discharge power and an amount of charge power for a respective energy storage device of the one or more energy storage systems 122. Alternatively, to reduce transmission bandwidth, the energy storage data may omit the discharge/charge parameters, and the one or more energy storage systems 122 may transmit the discharge/charge parameters when the one or more energy storage systems 122 are first connected to the microgrid controller 110.

The one or more energy storage systems 122 may receive requests (e.g., instructions) for the energy storage data to provide the energy storage data and/or continuously provide the energy storage data to the microgrid controller 110. The instructions may include energy storage dispatch (ESD) instructions. An ESD instruction may include an instruction to inject power to a system bus of the power system 106 or absorb power from the system bus of the power system 106. ESD instructions may be provided in control signals (e.g., communication signals that provide the ESD instructions). At least one ESD instruction may be utilized to rapidly stabilize the load, thereby stabilizing the bus frequency of the power system 106 in a time efficient manner, rather than attempting to stabilize the load using the one or more energy generator systems 120 alone. The one or more energy storage systems 122 may control the inverters and the electronic control mechanisms to control (1) quantity of load drawn by the one or more energy storage systems 122, or (2) the amount of AC power output produced by the one or more energy storage systems 122, in accordance with the ESD instructions.

The microgrid controller 110 may include at least one memory device (e.g., one or more memories) for storing instructions (e.g., program code); at least one processor for executing the instructions from the memory device to perform a set of desired operations; and a communication interface (e.g., coupled to a communication bus) for facilitating the communication between various system components. The instructions may be computer-readable instructions for executing a control application. The communication interface of the microgrid controller 110 may enable the microgrid controller 110 to communicate with the one or more energy generator systems 120 and the one or more energy storage systems 122. The microgrid controller 110, while executing the control application, may receive the generator data and the energy storage data (e.g., energy resource information), process the generator data and the energy storage data to generate one or more ESD instructions, and output the ESD instructions to one or more energy generator systems 120 and/or to one or more energy storage systems 122.

Figure 2:
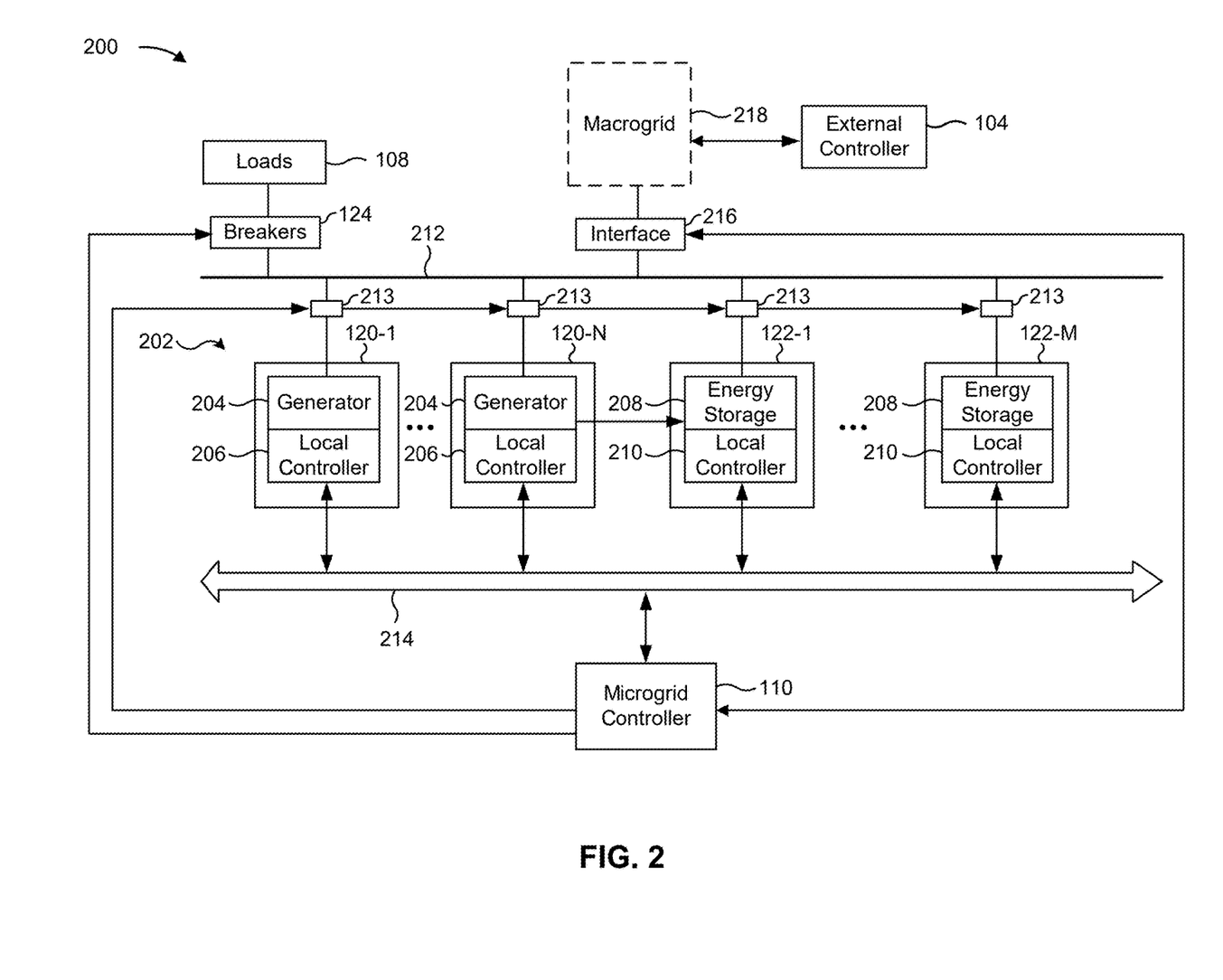
FIG. 2 shows a microgrid according to one or more implementations.

FIG. 2 shows a microgrid 200 according to one or more implementations. The microgrid 200 may be an example of the power system 106 described in connection with FIG. 1. The microgrid 200 may include a plurality of DERs 202. The plurality of DERs 202 may include N energy generator systems 120 and M energy storage systems 122, where N and M are integers greater than zero. For example, the plurality of DERs 202 may include a first energy generator system 120-1 and an $N^{th}$ energy generator system 120-N. Additionally, the plurality of DERs 202 may include a first energy storage system 122-1 and an $M^{th}$ energy storage system 122-M. Each energy generator system 120 may include a power generator 204 and a local generator controller 206. Each energy storage system 122 may include an electric storage device 208 (e.g., one or more batteries and/or capacitors) and a local ESS controller 210.

Each energy generator system 120 may be coupled to a power bus 212 for providing power to one or more loads connected to the power bus 212. Additionally, each energy storage system 122 may be coupled to the power bus 212 for providing power to or absorbing power from the power bus 212 (e.g., for providing power to or absorbing power from one or more components, such as one or more loads and/or one or more energy generator systems 120 connected to the power bus 212).

The microgrid 200 may also include the microgrid controller 110 that is communicatively coupled to the local controllers (e.g., local generator controllers 206 and local ESS controllers 210) of each DER 202 across a communication bus 214. The communication bus 214 may also enable the microgrid 200 to communicate with one or more loads and/or one or more load management systems (e.g., charging systems, fleet management systems, local load controllers, etc.). In some cases, two or more communication buses 214 may be provided. For example, one communication bus may be provided to communicate with local controllers and another communication bus may be provided to communicate with one or more loads and/or one or more load management systems.

Each local generator controller 206 may include any appropriate hardware, software, and/or firmware to sense and control a respective power generator 204, and send information to, and receive information from microgrid controller 110. For example, a local generator controller 206 may be configured to sense, determine, and/or store generator data of its respective power generator 204. The generator data may be sensed, determined, and/or stored in any conventional manner. Each local generator controller 206 may control whether a respective power generator 204 is connected to or disconnected from the power bus 212 (for example, based on an instruction or a control signal received from the microgrid controller 110).

Each local ESS controller 210 may include any appropriate hardware, software, and/or firmware to sense and control a respective electric storage device 208, and send information to, and receive information from microgrid controller 110. For example, a local ESS controller 210 may be configured to sense, determine, and/or store various characteristics of its respective electric storage device 208. Such characteristics of the respective electric storage device 208 may include, among others, a current SOC, a current energy, an SOC minimum threshold, an SOC maximum threshold, and a discharge limit of the respective electric storage device 208. These characteristics of respective electric storage device 208 may be sensed, determined, and/or stored in any conventional manner. Each local ESS controller 210 may control whether a respective electric storage device 208 is connected to or disconnected from the power bus 212 (for example, based on an instruction or a control signal received from the microgrid controller 110).

The microgrid controller 110 may receive or determine a need for charging or discharging of power from the microgrid 200, and may be configured to determine and send signals to allocate a total charge request and/or total discharge request across all of the plurality of DERs 202.

When performing the power allocation functions, the microgrid controller 110 may allocate a certain amount of power from each energy generator system 120 to one or more loads 108. The one or more loads 108 may be connected to the power bus 212 via one or more breakers 124 to receive power from the power bus. When performing the power allocation functions, the microgrid controller 110 may allocate a total charge request and/or a total discharge request across the energy storage systems 122 as a function of a usable energy capacity of each energy storage system 122. The usable energy capacity corresponds to the capacity or amount of energy that an energy storage system 122 can receive in response to a total charging request (usable charge energy), or the capacity or amount of energy that an energy storage system can discharge in response to a total discharge request (usable discharge energy). The usable charge energy is a function of a maximum state of charge, current state of charge, and current energy of the energy storage system, and the usable discharge energy is a function of a minimum state of charge, and current energy of the energy storage system 122. The microgrid controller 110 may determine a usable charge/discharge capacity of each energy storage system 122 (e.g., SOC), a desired charge/discharge of each energy storage system 122, a remainder power of each energy storage system 122, and/or an SOH of each energy storage system 122.

Thus, the microgrid controller 110 regulates a power supply of the microgrid 200 such that an exact amount of desired power flows in or out of the power system 106 at any given time. The microgrid controller 110 may regulate the power supply of the microgrid 200 in cooperation with the local generator controllers 206 and the local ESS controllers 210. The microgrid controller 110 may transmit control signals (e.g., instructions) to the local generator controllers 206 and the local ESS controllers 210 to activate (e.g., to bring online), deactivate (to bring offline), or curtail (limit or regulate to a target output) one or more of the DERs 202. Additionally, or alternatively, the microgrid controller 110 may transmit control signals to one or more switches 213 to control a switch state (e.g., an on state or an off state) of the one or more switches 213, for example, to connect one or more DERs 202 to or disconnect one or more DERs 202 from the microgrid 200 (e.g., the power bus 212). The switches 213 may be integrated in one or both interfaces 116 and 118 described in connection with FIG. 1.

In some cases, two or more power buses 212 may be provided. For example, a power bus may be provided to couple one or more power generators 204 to one or more electric storage devices 208 for charging the one or more electric storage devices 208. For example, the microgrid controller 110 may selectively couple a power generator 204 to an electric storage device 208 to charge the electric storage device 208. Thus, the power bus 212 may be part of a power distribution network of the microgrid 200 that may include one or more power buses used to distribute power between loads 108 and/or DERs 202.

The microgrid 200 may include an interface 216 for connecting the microgrid 200 to and disconnecting the microgrid 200 from an electrical power distribution system 218, such as a macrogrid. The electrical power distribution system 218 may include the external controller 104 (e.g., a macrogrid controller), as described in connection with FIG. 1. The external controller 104 may be coupled to the interface 216 for transmitting control signals, such as instructions or requests, to the microgrid controller 110. The interface 216 may be a PCC. The interface 216 may include one or more electrical connections used for connecting the microgrid 200 to the electrical power distribution system 218. The interface 216 may include one or more switches or breakers that are controlled by the microgrid controller 110 for connecting the microgrid 200 to and disconnecting the microgrid 200 from the electrical power distribution system 218. For example, the one or more switches or breakers of the interface 216 may connect the power bus 212 (or another system bus) to or disconnect the power bus 212 (or another system bus) from the electrical power distribution system 218. Thus, the microgrid controller 110 may configure the microgrid 200 to operate in a grid-connected mode by connecting the microgrid 200 to the electrical power distribution system 218 or in a stand-alone mode by disconnecting the microgrid 200 from the electrical power distribution system 218.

The electrical power distribution system 218 may include one or more first loads (e.g., macrogrid loads) to which the electrical power distribution system 218 provides power. The one or more first loads may include the microgrid 200 that includes one or more second loads (e.g., loads 108) and the plurality of DERs 202 (e.g., a plurality of energy resource systems).

The external controller 104 may control the one or more first loads associated with the electrical power distribution system 218, including the microgrid 200. The external controller 104 may treat the microgrid 200 as a single DER for simplified interaction and may incorporate reversed polarity for commands (e.g., reverse polarity VPP commands) with the microgrid controller 110 for communicating different classes of requests.

For example, a commands having a positive polarity may be provided from the microgrid controller 110 to the external controller 104 to request the external controller 104 to provide power from the electrical power distribution system 218 to the microgrid 200 (e.g., import power from macrogrid). In addition, commands having the positive polarity may be used by VPP registers to request a DER to provide power (e.g., export to macrogrid).

Alternatively, commands having a negative polarity may be provided from the external controller 104 to the microgrid controller 110 to request the electrical power distribution system 218 to absorb power from the microgrid 200 (e.g., export power to the macrogrid), or request a DER to absorb power (e.g., import from macrogrid). One or more commands from the external controller 104 may set grid real power control modes (additive), including a fixed kW, a power limit, a V-watt curve, and/or a freq-watt curve. One or more commands from the external controller 104 may set grid reactive power control modes (mutually exclusive), including fixed power factor (PF), a fixed kVAr, a volt-VAr curve, and/or watt-Var curve.

The microgrid controller 110 may receive one or more first control signals from the external controller 104 and control a power connection of the microgrid 200 to the electrical power distribution system 218 based on the one or more first control signals. The microgrid controller 110 is configurable in a grid-connected mode, during which the microgrid 200 is connected to the electrical power distribution system 218, and a stand-alone mode, during which the microgrid 200 is disconnected from the electrical power distribution system 218. For example, the microgrid 200 may be connected to or disconnected from the electrical power distribution system 218 by controlling one or more switches or breakers provided at the interface 216. The microgrid controller 110 may operate in the grid-connected mode or in the stand-alone mode based on the one or more first control signals.

The microgrid controller 110 may provide one or more second control signals for controlling a power connection (e.g., a switch or a breaker at interface 216) of the microgrid 200 to the electrical power distribution system 218, provide one or more third control signals for controlling the plurality of loads 108 associated with the microgrid 200, and provide one or more fourth control signals for controlling the plurality of DERs 202 associated with the microgrid 200.

The microgrid controller 110 may process the one or more first control signals and control the power connection of the microgrid 200 to the electrical power distribution system 218 based on the one or more first control signals. The microgrid controller 110 may generate the one or more second control signals, the one or more third control signals, and the one or more fourth control signals based on the microgrid controller 110 operating in the grid-connected mode or in the stand-alone mode. In other words, the microgrid controller 110 may reconfigure the one or more second control signals, the one or more third control signals, and the one or more fourth control signals based on whether the external controller 104 instructs the microgrid controller 110 to operate in the grid-connected mode or in the stand-alone mode in order to appropriately manage the loads 108 and the DERs 202. The microgrid controller 110 may reconfigure the one or more second control signals, the one or more third control signals, and the one or more fourth control signals based on one or more additional conditions specified by the external controller 104 and/or by one or more conditions specified within the microgrid 200.

For example, based on the one or more first control signals, the microgrid controller 110 may operate in the grid-connected mode and generate the one or more second control signals to configure one or more power interfaces (e.g., one or more power interfaces of interface 216) of the microgrid 200 to receive power from the macrogrid.

Additionally, the one or more first control signals may indicate a microgrid power limit that defines a total amount of power the microgrid 200 is permitted to draw from the electrical power distribution system 218. The total amount of power the microgrid 200 is permitted to draw from the electrical power distribution system 218 may be inferred by the microgrid controller 110 as a grid-connected mode command or a stand-alone mode command. For example, the microgrid controller 110 may, based on the microgrid power limit being greater than zero, operate in the grid-connected mode, and, based on the microgrid power limit being equal to zero, operate in the stand-alone mode.

The microgrid controller 110 may, during the grid-connected mode, generate the one or more third control signals to regulate a number of loads 108 that are connected to a power distribution network of the microgrid 200 (e.g., to one or more power buses 212 of the microgrid 200) to satisfy the microgrid power limit. In some cases, the microgrid controller 110 may, during the grid-connected mode, generate the one or more third control signals to regulate a number of loads 108 that are connected to the power distribution network of the microgrid 200 to satisfy the microgrid power limit and a total load demand on the microgrid 200 (for example, by one or more loads 108). The microgrid controller 110 may, during the grid-connected mode, decrease the number of loads 108 drawing power from the power distribution network of the microgrid 200 to satisfy the microgrid power limit. For example, the external controller 104 may set the microgrid power limit to a value that is lower than a current power consumption of the microgrid (e.g., of the loads 108 connected to the power distribution network). Thus, the microgrid controller 110 may shed one or more of the loads 108 to satisfy the microgrid power limit. In contrast, if the external controller 104 increases the microgrid power limit, the microgrid controller 110 may add one or more of the loads 108 to the power distribution network. In some cases, the microgrid controller 110 may curtail one or more loads 108 to satisfy the microgrid power limit such that curtailed loads have a reduced rate of power consumption relative to a maximum rate of power consumption.

Additionally, or alternatively, the microgrid controller 110 may, during the grid-connected mode, generate the one or more fourth control signals to regulate a number of DERs 202 supplying power to the power distribution network to satisfy the microgrid power limit. In some cases, the microgrid controller 110 may, during the grid-connected mode, generate the one or more fourth control signals to regulate the number of DERs 202 supplying power to the power distribution network to satisfy the microgrid power limit and the total load demand on the microgrid. The microgrid controller 110 may, during the grid-connected mode, increase the number of DERs 202 supplying power to the power distribution network of the microgrid 200 to satisfy the microgrid power limit. For example, the external controller 104 may set the microgrid power limit to a value that is lower than a current power consumption of the microgrid (e.g., of the loads 108 connected to the power distribution network). Thus, the microgrid controller 110 may add one or more of the DERs 202 supplying power to the power distribution network of the microgrid 200 (e.g., supplying power to loads 108) in order to satisfy the microgrid power limit. In contrast, if the external controller 104 increases the microgrid power limit, the microgrid controller 110 may shed one or more of the DERs 202 supplying power to the power distribution network of the microgrid 200. In some cases, the microgrid controller 110 may curtail one or more DERs 202 to satisfy the microgrid power limit such that curtailed DERs provide a reduced rate of power flow relative to a maximum rate of power flow.

The microgrid controller 110 may, based on the one or more first control signals, operate in the grid-connected mode and generate the one or more second control signals to configure one or more power interfaces of the microgrid 200 to supply power to the electrical power distribution system 218. In other words, the microgrid controller 110 may configure the interface 216 such that the microgrid 200 supplies power to the electrical power distribution system 218. For example, the one or more first control signals may include a power export request for the microgrid controller 110 to supply the power to the electrical power distribution system 218. The power export request may include an amount of power requested. The microgrid controller 110 may generate the one or more fourth control signals to regulate the number of DERs 202 connected to the power distribution network of the microgrid 200 to satisfy the amount of power requested. The microgrid controller 110 may regulate, in any combination, the number of loads 108 and/or the number of DERs 202 connected to the power distribution network of the microgrid 200 to satisfy the amount of power requested. For example, the microgrid controller 110 may shed one or more loads 108 from the power distribution network of the microgrid 200 so that the plurality of DERs 202 can provide more power to the electrical power distribution system 218 to satisfy the amount of power requested.

As a result, the microgrid controller 110 may, during the grid-connected mode, regulate the number of loads 108 connected to the power distribution network of the microgrid 200 and the number of DERs 202 supplying power to the power distribution network to satisfy the microgrid power limit, the total load demand on the microgrid 200, and/or the amount of power requested in the power export request. Thus, the microgrid controller 110 may dynamically manage different combinations of loads 108 and DERs 202 based on one or more conditions set by the external controller 104. Additionally, the microgrid controller 110 may dynamically manage different combinations of loads 108 and DERs 202 based on existing conditions within the microgrid 200, such as existing load conditions of loads 108, an availability of each DER 202 to supply power, and how much power each DER 202 can supply.

Figure 3:
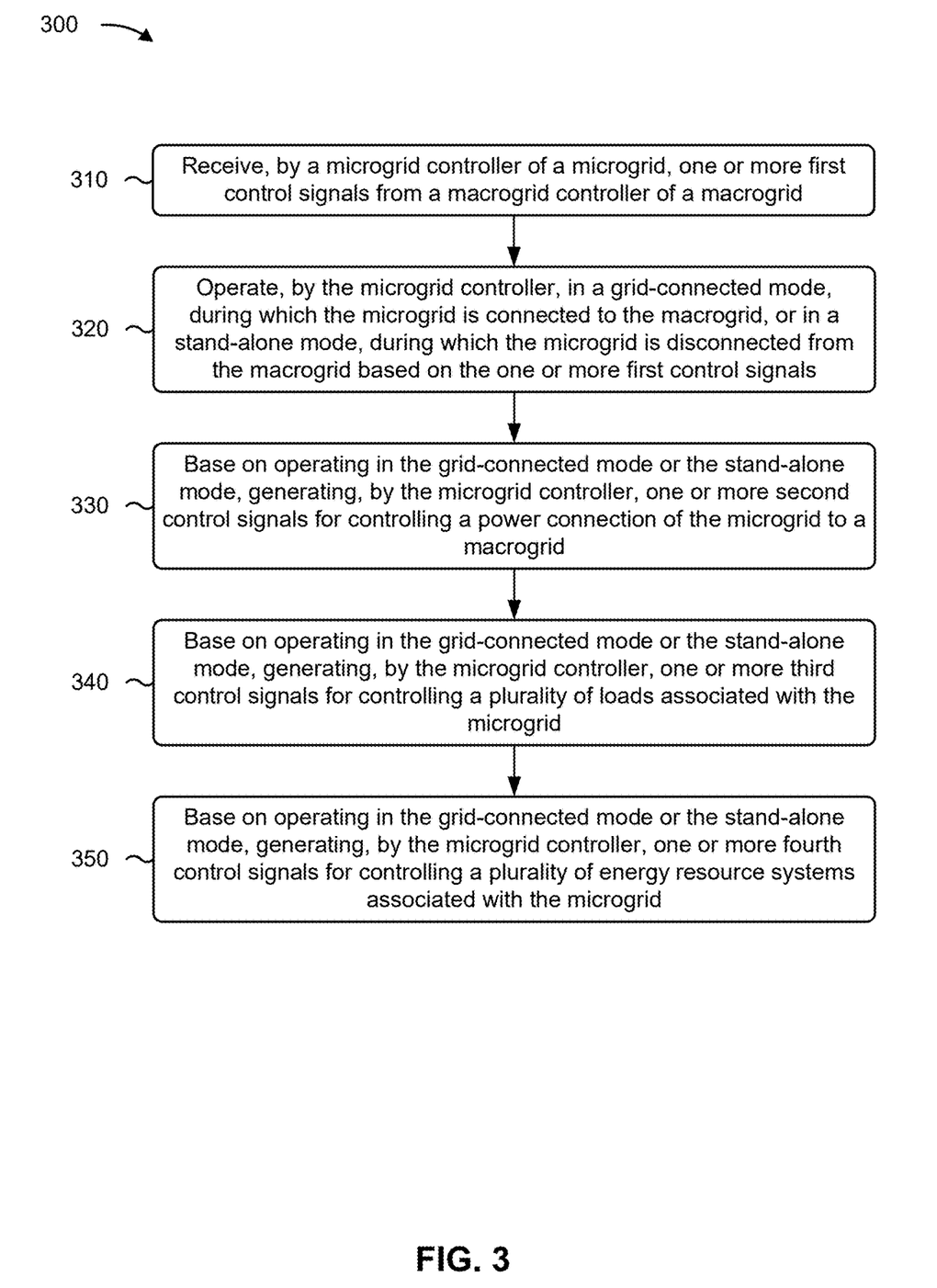
FIG. 3 is a flowchart of an example process associated with flexible load stabilization modes for a power distribution system.

FIG. 3 is a flowchart of an example process 300 associated with flexible load stabilization modes for a power distribution system. One or more process blocks of FIG. 3 may be performed by a microgrid controller (e.g., microgrid controller 110). Additionally, or alternatively, one or more process blocks of FIG. 3 may be performed by another device or a group of devices separate from or including the microgrid controller, such as another device or component that is internal or external to the microgrid 200.

Process 300 may include receiving one or more first control signals from a macrogrid controller of a macrogrid (block 310); operating, in a grid-connected mode, during which the microgrid is connected to the macrogrid, or in a stand-alone mode, during which the microgrid is disconnected from the macrogrid based on the one or more first control signals (block 320); based on operating in the grid-connected mode or the stand-alone mode, generating one or more second control signals for controlling a power connection of the microgrid to a macrogrid (block 330); based on operating in the grid-connected mode or the stand-alone mode, generating one or more third control signals for controlling a plurality of loads associated with the microgrid (block 340); and based on operating in the grid-connected mode or the stand-alone mode, generating one or more fourth control signals for controlling a plurality of energy resource systems associated with the microgrid (block 350).

Generating the one or more second control signals may include generating, based on the microgrid controller operating in the grid-connected mode, the one or more second control signals to configure one or more power interfaces of the microgrid to receive power from the macrogrid or to configure the one or more power interfaces of the microgrid to supply power to the macrogrid.

Generating the one or more third control signals may include generating, based on the microgrid controller operating in the grid-connected mode, the one or more third control signals to regulate a number of loads connected to a power distribution network of the microgrid to satisfy at least one of a microgrid power limit, a total load demand on the microgrid, or a power export request, wherein the microgrid power limit defines a total amount of power the microgrid is permitted to draw from the macrogrid.

Generating the one or more third control signals may include generating, based on the microgrid controller operating in the grid-connected mode, the one or more fourth control signals to regulate a number of energy resource systems supplying power to the power distribution network to satisfy at least one of the microgrid power limit, the total load demand on the microgrid, or the power export request.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
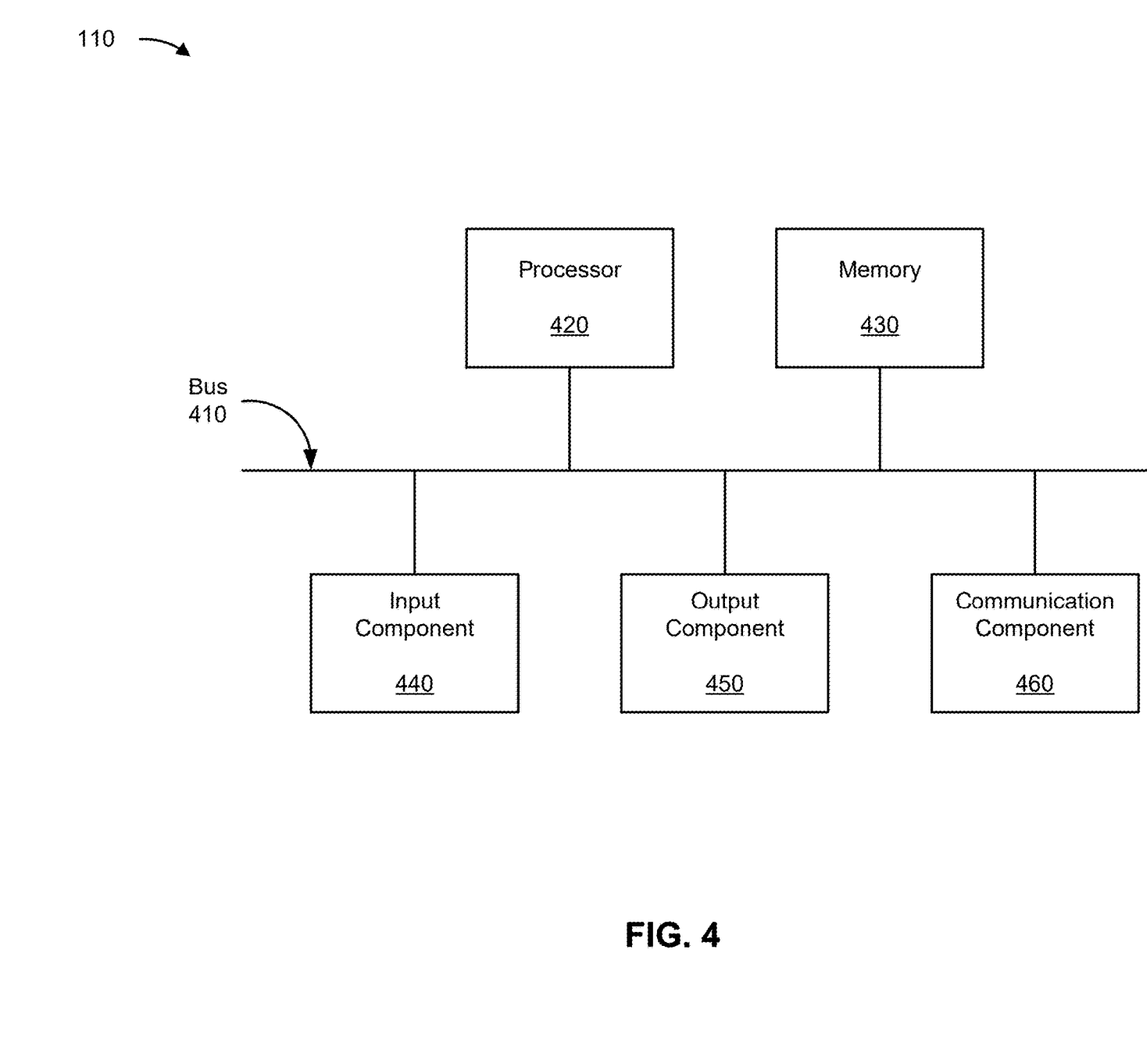
FIG. 4 is a diagram of example components of the microgrid controller associated with an optimized control method for power distribution scheduling in the microgrid controller.

FIG. 4 is a diagram of example components of the microgrid controller 110 associated with an optimized control method for power distribution scheduling in the microgrid controller 110. The microgrid controller 110 may include a bus 410, a processor 420, a memory 430, an input component 440, an output component 450, and/or a communication component 460.

The bus 410 may include one or more components that enable wired and/or wireless communication among the components of the microgrid controller 110. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus.

The processor 420 may include a central processing unit a microprocessor, a controller, a microcontroller, a digital signal processor, a field-programmable gate array, an application-specific integrated circuit, and/or another type of processing component. The processor 420 may be implemented in hardware, firmware, or a combination of hardware and software. The processor 420 may include one or more processors capable of being programmed to perform one or more operations or processes described elsewhere herein. For example, the processor 420 may be configured to perform one or more operations included in process 300.

The memory 430 may store information, one or more instructions, and/or software (e.g., one or more software applications) related to the operation of the microgrid controller 110. The memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430. For example, the memory 430 may store one or more power distribution schedules described elsewhere herein, and the one or more power distribution schedules may be accessed by the processor 420 for performing scheduling operations.

The input component 440 may enable the microgrid controller 110 to receive input, load information, generator data, energy storage data, status information, scheduling information, and/or control signals (e.g., control signals from a macrogrid controller). The output component 450 may enable the microgrid controller 110 to provide output, such as one or more control signals for controlling loads, energy storage systems, breakers, switches, and other components associated with the microgrid described herein. The communication component 460 may enable the microgrid controller 110 to communicate with other devices via a wired connection and/or a wireless connection. For example, the communication component 460 may include a receiver, a transmitter, and/or a transceiver.

The microgrid controller 110 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. Execution of the set of instructions, by one or more processors 420, may cause the one or more processors 420 and/or the microgrid controller 110 to perform one or more operations or processes described herein. Hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

INDUSTRIAL APPLICABILITY

One or more implementations provide a user-friendly and versatile power distribution scheme for microgrid controllers, facilitating control by both utility companies and individual support staff. An external controller, potentially connected through a VPP, allows diverse functionalities: grid connection/islanding control, real/reactive power flow requests, enabling/disabling grid support functions, and VPP override for optimized management. An external controller treats the entire microgrid as a single DER for simplified interaction and incorporates reversed polarity for VPP commands. The external controller may request the microgrid controller to connect to or island off from the macrogrid, request a desired value of real power flow or a value of reactive power flow at a PCC (e.g., a microgrid power limit that defines a total amount of power that the microgrid is permitted to draw from the macrogrid), and enable and disable grid support functions (e.g., whether the microgrid supplies power to the macrogrid). In response, the microgrid controller may manage loads and DERs associated with the microgrid to meet the requests received from the external controller. The microgrid controller may configure the microgrid to be a load or a DER of the macrogrid based on one or more requests received from the external controller. Additionally, flexible control modes for real and reactive power exchange with the macrogrid are provided. Accordingly, microgrid operation and grid interaction may be enhanced through efficient, user-friendly, and adaptable power management. Additionally, methods disclosed herein can be used between independent microgrids to manage loss of a grid or create redundancy for load stabilization.

What is claimed is:

1. A power distribution system, comprising:
a macrogrid controller configured to control one or more first loads associated with a macrogrid, wherein the one or more first loads include a microgrid comprising one or more second loads and a plurality of energy resource systems; and
a microgrid controller configured to;
 receive one or more control signals, from the macrogrid controller, indicating a microgrid power limit that defines a total amount of power that the microgrid is permitted to draw from the macrogrid, and
 control a power connection of the microgrid to the macrogrid based on the one or more control signals,
wherein the microgrid controller is configurable in a grid-connected mode, during which the microgrid is connected to the macrogrid when the microgrid power limit is greater than zero, and a stand-alone mode, during which the microgrid is disconnected from the macrogrid when the microgrid power limit is equal to zero.

2. The power distribution system of claim 1,
wherein the microgrid controller is configured to, based on the one or more control signals, operate in the grid-connected mode and configure one or more power interfaces of the microgrid to receive power from the macrogrid.

3. The power distribution system of claim 1,
wherein the microgrid controller is configured to, during the grid-connected mode, regulate a number of second loads connected to a power distribution network of the microgrid to satisfy the microgrid power limit.

4. The power distribution system of claim 3,
wherein the microgrid controller is configured to, during the grid-connected mode, decrease the number of second loads drawing power from the power distribution network of the microgrid to satisfy the microgrid power limit.

5. The power distribution system of claim 1,
wherein the microgrid controller is configured to, during the grid-connected mode, regulate a number of energy resource systems connected to a power distribution network of the microgrid to satisfy the microgrid power limit.

6. The power distribution system of claim 5,
wherein the microgrid controller is configured to, during the grid-connected mode, increase the number of energy resource systems supplying power to the power distribution network of the microgrid to satisfy the microgrid power limit.

7. The power distribution system of claim 1, wherein the microgrid controller is configured to, during the grid-connected mode, regulate a number of second loads connected to a power distribution network of the microgrid and a number of energy resource systems supplying power to the power distribution network to satisfy the microgrid power limit and a total load demand on the microgrid.

8. The power distribution system of claim 1, wherein the microgrid controller is configured to, based on the one or more control signals, operate in the grid-connected mode and configure one or more power interfaces of the microgrid to supply power to the macrogrid.

9. The power distribution system of claim 8, wherein the one or more control signals includes a power export request for the microgrid controller to supply the power to the macrogrid.

10. The power distribution system of claim 9, wherein the power export request includes an amount of power requested, and
wherein the microgrid controller is configured to regulate a number of energy resource systems connected to a power distribution network of the microgrid to satisfy the amount of power requested.

11. A microgrid controller of a microgrid, comprising:
one or more communication interfaces configured to receive one or more first control signals from a macrogrid controller of a macrogrid, provide one or more second control signals for controlling a power connection of the microgrid to the macrogrid, provide one or more third control signals for controlling a plurality of loads associated with the microgrid, and provide one or more fourth control signals for controlling a plurality of energy resource systems associated with the microgrid,
wherein the one or more first control signals indicate a microgrid power limit that defines a total amount of power that the microgrid is permitted to draw from the macrogrid, and
wherein the microgrid controller is configurable in a grid-connected mode, during which the microgrid is connected to the macrogrid when the microgrid power limit is greater than zero, and a stand-alone mode, during which the microgrid is disconnected from the macrogrid when the microgrid power limit is equal to zero; and
one or more processors configured to:
process the one or more first control signals,
control the power connection of the microgrid to the macrogrid based on the one or more first control signals,
generate, based on controlling the power connection, the one or more second control signals, the one or more third control signals, and the one or more fourth control signals based on the microgrid controller operating in the grid-connected mode or in the stand-alone mode.

12. The microgrid controller of claim 11, wherein the one or more processors are configured to, based on the one or more first control signals, operate in the grid-connected mode and generate the one or more second control signals to configure one or more power interfaces of the microgrid to receive power from the macrogrid.

13. The microgrid controller of claim 12, wherein the microgrid controller is configured to, during the grid-connected mode, generate the one or more third control signals to regulate a number of second loads connected to a power distribution network of the microgrid to satisfy the microgrid power limit and a total load demand on the microgrid, and
wherein the microgrid controller is configured to, during the grid-connected mode, generate the one or more fourth control signals to regulate a number of energy resource systems supplying power to the power distribution network to satisfy the microgrid power limit and the total load demand on the microgrid.

14. The microgrid controller of claim 11, wherein the one or more processors are configured to, based on the one or more first control signals, operate in the grid-connected mode and generate the one or more second control signals to configure one or more power interfaces of the microgrid to supply power to the macrogrid.

15. The microgrid controller of claim 14, wherein the one or more first control signals include a power export request for the microgrid controller to supply the power to the macrogrid,
wherein the power export request includes an amount of power requested, and
wherein the microgrid controller is configured to generate the one or more fourth control signals to regulate a number of energy resource systems connected to a power distribution network of the microgrid to satisfy the amount of power requested.

16. A control method, comprising:
receiving, by a microgrid controller of a microgrid, one or more first control signals from a macrogrid controller of a macrogrid,
wherein the one or more first control signals indicate a microgrid power limit that defines a total amount of power that the microgrid is permitted to draw from the macrogrid, and
wherein the microgrid controller is configurable in a grid-connected mode, during which the microgrid is connected to the macrogrid when the microgrid power limit is greater than zero, and a stand-alone mode, during which the microgrid is disconnected from the macrogrid when the microgrid power limit is equal to zero;
operating, by the microgrid controller, in the grid-connected mode or in the stand-alone mode;
based on operating in the grid-connected mode or the stand-alone mode, generating, by the microgrid controller, one or more second control signals for controlling a power connection of the microgrid to the macrogrid;
based on operating in the grid-connected mode or the stand-alone mode, generating, by the microgrid controller, one or more third control signals for controlling a plurality of loads associated with the microgrid; and
based on operating in the grid-connected mode or the stand-alone mode, generating, by the microgrid controller, one or more fourth control signals for controlling a plurality of energy resource systems associated with the microgrid.

17. The method of claim 16, further comprising:
generating, based on the microgrid controller operating in the grid-connected mode, the one or more second control signals to configure one or more power interfaces of the microgrid to receive power from the macrogrid or to configure the one or more power interfaces of the microgrid to supply power to the macrogrid;

generating, based on the microgrid controller operating in the grid-connected mode, the one or more third control signals to regulate a number of loads connected to a power distribution network of the microgrid to satisfy at least one of the microgrid power limit, a total load demand on the microgrid, or a power export request; and generating, based on the microgrid controller operating in the grid-connected mode, the one or more fourth control signals to regulate a number of energy resource systems supplying power to the power distribution network to satisfy at least one of the microgrid power limit, the total load demand on the microgrid, or the power export request.

18. The power distribution system of claim 1,
wherein the microgrid controller is configured to assign different priorities to the one or more second loads, and during the grid-connected mode, drop at least one of the one or more second loads to satisfy the microgrid power limit based on the priorities.

19. The power distribution system of claim 1,
wherein the microgrid controller is configured to reduce a power rate of at least one of the one or more second loads relative to a maximum power consumption rate based on the microgrid power limit.

20. The power distribution system of claim 1,
wherein the microgrid controller is configured to reduce a power output rate of at least one of the plurality of energy resource systems relative to a maximum power output rate based on the microgrid power limit.

* * * * *